United States Patent
Castro et al.

(10) Patent No.: US 12,455,904 B2
(45) Date of Patent: Oct. 28, 2025

(54) AUTOMATIC QUASI-IDENTIFIER DETECTION AND RECOMMENDATIONS

(71) Applicant: Protegrity US Holding, LLC, Stamford, CT (US)

(72) Inventors: André Castro, Lisbon (PT); David Clyde Williamson, Great Missenden (GB); Vichai Levy, Norwalk, CT (US); Chandan Chaitanya, Telangana (IN)

(73) Assignee: Protegrity US Holding, LLC, Stamford, CT (US)

( * ) Notice: Subject to any disclaimer, the term of this patent is extended or adjusted under 35 U.S.C. 154(b) by 0 days.

(21) Appl. No.: 18/912,980

(22) Filed: Oct. 11, 2024

(65) Prior Publication Data

US 2025/0139131 A1    May 1, 2025

Related U.S. Application Data

(60) Provisional application No. 63/593,535, filed on Oct. 27, 2023, provisional application No. 63/593,536, filed on Oct. 27, 2023.

(51) Int. Cl.
*G06F 7/00* (2006.01)
*G06F 16/28* (2019.01)
*G06F 21/62* (2013.01)

(52) U.S. Cl.
CPC ........ *G06F 16/285* (2019.01); *G06F 21/6254* (2013.01)

(58) Field of Classification Search
CPC .................. G06F 16/285; G06F 21/6254

USPC .................................................. 707/600–899
See application file for complete search history.

(56) References Cited

U.S. PATENT DOCUMENTS

| | | |
|---|---|---|
| 2004/0255137 A1 | 12/2004 | Ying |
| 2013/0238621 A1* | 9/2013 | Ganjam ............... G06F 16/951 707/E17.084 |
| 2020/0050966 A1 | 2/2020 | Enuka et al. |
| 2020/0334228 A1 | 10/2020 | Matyska et al. |

OTHER PUBLICATIONS

United States Office Action, U.S. Appl. No. 18/912,985, Jul. 7, 2025, 13 pages.

* cited by examiner

*Primary Examiner* — Isaac M Woo
(74) *Attorney, Agent, or Firm* — Fenwick & West LLP

(57) ABSTRACT

A data privacy system automatically determines quasi-identifiers in a database containing individuals' records. The data privacy system applies a machine learning model to the database, the model configured to classify each record in the database and output a measure of its confidence in its classification. The data privacy system determines, based on the measure of confidence, how important each attribute is to the model's classification. The data privacy system iteratively applies a machine learning model on a modified database that includes the highest ranked attributes to identify the quasi-identifiers in the records in the database. The data privacy system can use identified quasi-identifiers to determine if the database is susceptible to a membership inference attack, and in response to such a determination, can perform one or more data privacy operations on the database to reduce this risk.

20 Claims, 7 Drawing Sheets

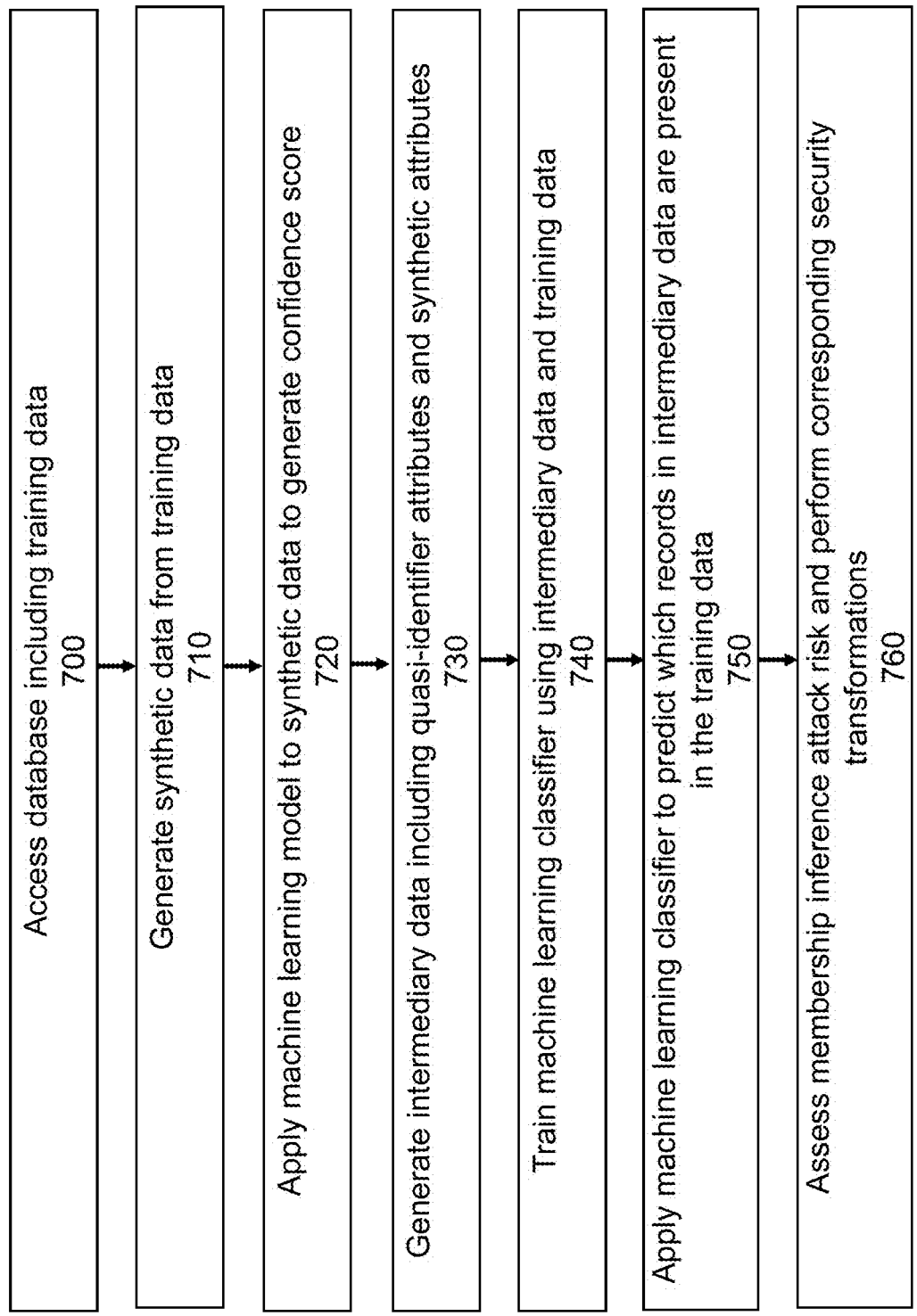

AUTOMATIC QUASI-IDENTIFIER DETECTION AND RECOMMENDATIONS

CROSS REFERENCE TO RELATED APPLICATIONS

This application claims the benefit of U.S. Provisional Application No. 63/593,536, filed Oct. 27, 2023, and of U.S. Provisional Application No. 63/593,535, filed Oct. 27, 2023, both of which are incorporated by reference in its entirety.

TECHNICAL FIELD

The disclosure generally relates to the field of data security and data privacy, and specifically to a data security and privacy system designed to identify and protect quasi-identifier information.

BACKGROUND

A database may include sensitive information about one or more individuals. In some contexts, a malicious actor may be able to use a combination of both publicly available information and confidential data in the database to discern an individual's identity, even if that data has been transformed in a way that protects individual's privacy. A sophisticated malicious actor may still be able to identify the real individuals based on the information included in the database, and may be able to determine if the individuals are included in the database. Conventional privacy methods addressing these issues are time and labor intensive and require high levels of domain expertise.

SUMMARY

A data privacy system uses machine learning to determine quasi-identifiers in a dataset, which is comprised of rows corresponding to records and columns corresponding to attributes. As used herein, "dataset" and "database" may be used interchangeably. The system applies a machine learning model to the dataset. This model is configured to classify each record in the dataset, which can include many classes of records. The machine learning model also outputs a feature importance for each of the attributes used to classify records. For every attribute, the feature importance represents the attribute's contribution to the machine learning model's classification of each record. The system ranks the attributes based on their feature importance for all the one-vs-rest classifiers. A forward feature selection method is used to determine which attributes are the most relevant to distinguish records from each other. This feature selection method starts from the highest to the lowest attribute regarding their feature importance determined on the previous step. For instance, the system may iteratively apply the machine learning model to a modified database to produce a set of records corresponding to the highest measures of confidence. The modified database is modified to include the next highly ranked attribute until consecutive sets of records have an above-threshold measure of similarity. The attributes included in the modified database before a most recently included attribute are flagged as quasi-identifying attributes. In some embodiments, classification metrics are calculated and analyzed to assess the point at which adding more features significantly worsens the performance of the one-vs-rest classifiers. At the previous step to this point, the used attributes are flagged as quasi-identifiers. In some embodiments, a non-transitory computer readable storage medium performs the steps described above.

A data privacy system uses machine learning to assess the risk of membership inference attacks on synthetic data. The data privacy system accesses a database comprising a set of rows corresponding to records and a set of columns corresponding to attributes. The database is split into a first training database and a first holdout database. In some embodiments, the system applies a synthetic data engine to the first training database to generate a synthetic database and then applies a machine learning model to the synthetic database to produce a measure of confidence that each synthetic record in the synthetic database is a record in the accessed database. In other embodiments, the synthetic database is generated in advance and accessed by the data privacy system. The machine learning model is configured to classify an input record as one or more of the records in the accessed database. The system generates an intermediary database comprising records of the accessed database, attributes within the accessed database determined to be quasi-identifiers, synthetic attributes corresponding to a threshold number of synthetic records associated with the greatest measures of confidence, and a determination of whether each record is in the first training database. The system splits the intermediary database into a second training database and a second holdout database. The system trains a machine learning binary classifier using the second training database, the classifier configured to classify an input record as present or absent in the first training database. The system applies the trained machine learning classifier to the second holdout database to predict which records in the second holdout database are in the first training database. After the machine learning classifier successfully identifies which records within the second holdout database are within the first training database, the system flags the accessed database as susceptible to a membership inference attack. In some embodiments, a non-transitory computer readable storage medium performs the steps described above.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7 illustrates an example process for assessing a database's susceptibility to membership inference attacks, in accordance with an example embodiment.

DETAILED DESCRIPTION

Figure 1:
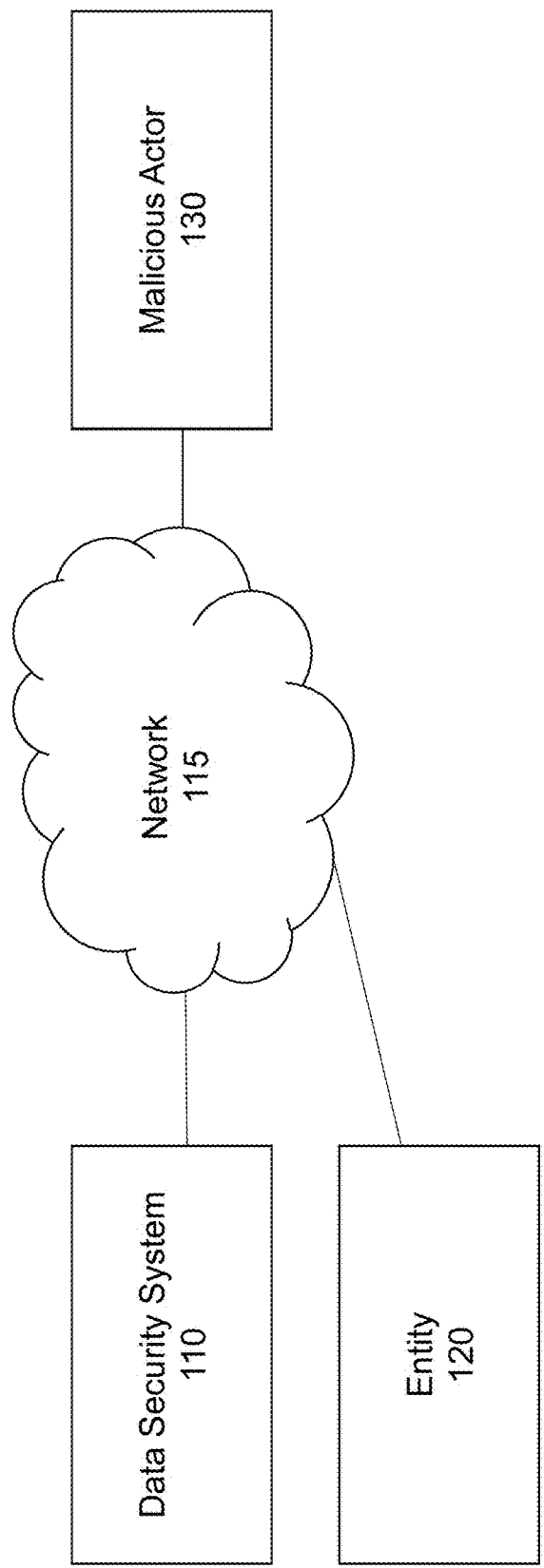
FIG. 1 is a high-level block diagram of a system environment in which a data privacy system operates, in accordance with an example embodiment.

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. A letter after a reference numeral, such as "120A," indicates that the text refers specifically to the element having that particular reference numeral. A reference numeral in the text without a following letter, such as "120," refers to any or all of the elements in the figures bearing that reference numeral.

The figures depict embodiments of the disclosed system (or method) for purposes of illustration only. One skilled in the art will readily recognize from the following description that alternative embodiments of the structures and methods illustrated herein may be employed without departing from the principles described herein.

BACKGROUND

A database may include data records including one or more individuals' personal identifiable information (PII). PII includes direct identifying information unique to an individual, such as government identification numbers (e.g., driver's license number, social security number, etc.), as well as other quasi-identifying attributes (referred to herein as "quasi-identifiers") that may not be entirely unique to them (e.g., date of birth, sex, gender, occupation, age, salary, postal code, etc.). To preserve individuals' privacy, a data privacy administrator may perform certain security measures on the data in the database. For example, the administrator may perform data security operations on the data and/or remove direct identifiers—or a portion of the other identifying information—from the database. The administrator may add fabricated data records ("synthetic data") to the database to further anonymize individuals' data in the database. Despite these security measures, sophisticated malicious actors may still be able to discern individuals' identities and sensitive personal data. A malicious actor may be able to leverage quasi-identifiers that collectively indicate an individual's identity, even without the individual's direct identifying information. For example, a malicious actor may collectively consider an individual's date of birth, state of residence, occupation, salary, and highest earned degree to discern the individual's identity. Malicious actors may also perform membership inference attacks (MIA). In the context of this system, a MIA is defined as: given a synthetic data record and probable access to real quasi-identifiers, determine if the record was part on the training dataset that originated said synthetic data (which assumes that the attacker does not have access to the synthetic data generator).

Conventional methods for preventing such security threats are time and labor intensive, requiring manual input of sensitive attributes and extensive domain knowledge. The data privacy system described herein uses machine learning to automatically identify quasi-identifiers in a database and estimate a synthetic database's susceptibility to a membership inference attack. The data privacy system may use the output of the system to further bolster the privacy of the database.

System Environment

FIG. 1 is a high-level block diagram of a system environment 100 in which a data privacy system 110 operates, in accordance with an example embodiment. The system environment 100 also includes a network 115, an entity 120, and a malicious actor 130. In some embodiments, the system environment 100 includes components other than those described herein. For clarity, although FIG. 1 only shows one entity 120 and one malicious actor 130, alternate embodiments of the system environment 100 can have any number of entities, data privacy systems, and/or malicious actors. Additional components such as web servers, network interfaces, security functions, load balancers, failover servers, management and network operations consoles, and the like are not shown so as to not obscure the details of the system environment.

The network 115 transmits data within the system environment 100. The network 115 transmits data packets between a plurality of network nodes, including the data privacy system 110 and the entity 120. The network 115 may be a local area or wide area network using wireless or wired communication systems, such as the Internet. In some embodiments, the network 115 transmits data over a single connection (e.g., a data component of a cellular signal, or Wi-Fi, among others), or over multiple connections. The network 115 may include encryption capabilities to ensure the security of data transmitted through the system environment 100. For example, encryption technologies may include secure sockets layers (SSL), transport layer security (TLS), virtual private networks (VPNs), and Internet Protocol security (IPsec), among others.

The entity 120 is an institution (e.g., corporation, partnership, law firm, organization, etc.), individual, or set of individuals that legally has access to, uses, and/or stores individuals' data, including PII, in a database. For example, the entity 120 may be a school with a database including records about its students, students' families, teachers, and staff. In another embodiment, the entity 120 may be a company with database records about its consumers, suppliers, and vendors. The entity 120 may access, use, and/or store the individuals' data on one or more devices that are connected to the network 115 and can receive, process, store, and send data. Examples of devices include conventional computer systems (such as a desktop or a laptop computer, a server, a cloud computing device, and the like), mobile computing devices (such as smartphones, tablet computers, mobile devices, and the like), or any other device having computer functionality. The devices of the entity 120 are configured to communicate via the network 115, for example using a native application executed by the devices or through an application programming interface (API) running on a native operating system of the devices, such as IOS® or ANDROID™. In another embodiment, the devices of the entity 120 are virtual.

The malicious actor 130 is an entity with unauthorized access to the entity 120's data, that attempts to access the entity's data without authorization, a hacker, or any other entity that is not authorized to access, view, or other use the entity's data. The malicious actor 130 may seek to compromise the privacy of individuals whose data is stored by the entity 120. For example, the malicious actor 130 may attempt to reidentify individuals from anonymized data, such as by conducting a membership inference attack on synthetic data stored, accessed, and/or used by the entity 120. The system environment 100 may include more than one malicious actor.

The data privacy system 110 implements security measures to protect the privacy of individuals whose data is accessed, stored, and/or used by the entity 120 from attacks by the malicious actor 130. In some embodiments, the data privacy system 110 is a device of the entity 120. In other embodiments, the data privacy system is stored and/or executed on a device of the entity 120. The data privacy system 110 uses machine learning models to identify quasi-identifying information in data records accessed, used, and/or stored by the entity 120, as well as to estimate the malicious actor 130's success in accessing real PII in a membership inference attack. The data privacy system 110 may perform privacy transformations on the data accessed, used, and/or stored by the entity 120 based on the output of the machine learning models, such as further anonymizing and/or encoding the data before transmitting the data to the entity 120 or any other suitable entity. In some embodiments, the data privacy system 110 also performs network security operations, such as notifying users of the entity 120 of the malicious actor 130's data attack, blocking incoming data requests from the malicious actor 130, and so on.

Figure 2:
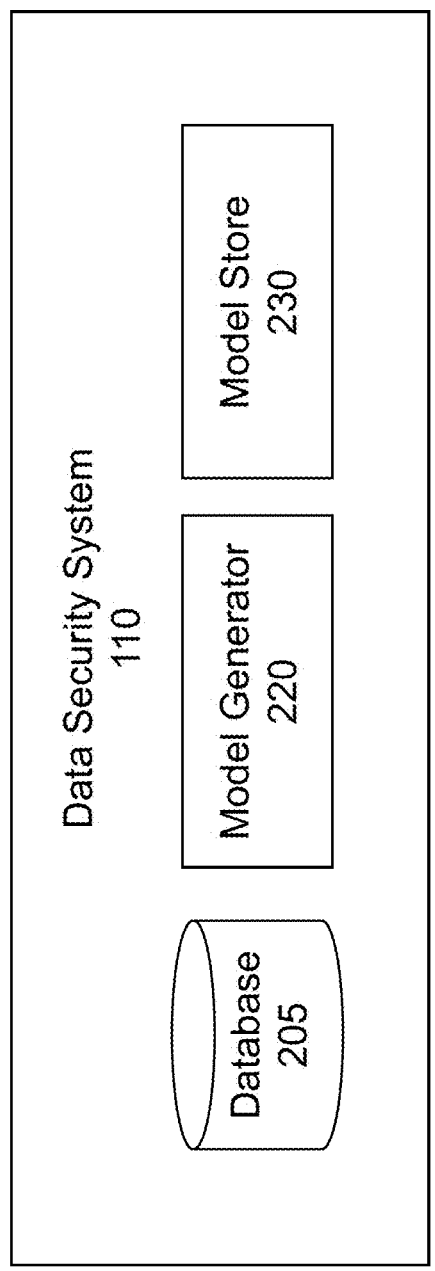
FIG. 2 is a high-level block diagram of the data privacy system, in accordance with an example embodiment.

FIG. 2 is a high-level block diagram of the data privacy system 110, in accordance with an example embodiment. The data privacy system 110 includes a database 205, a model generator 220, and a model store 230. The data privacy system 110 may include components other than those described herein and components may be distributed differently than those depicted herein.

The database 205 is configured to store data about one or more individuals. This data may include direct identifying information, e.g., attributes that are unique to each individual and that directly identify them. Examples of direct identifying information include social security number, passport number, driver's license number, bank account number, credit card number, taxpayer identification number, phone number, home address, and so on. The data may also include other identifying attributes that are not solely unique to the individual (e.g., more than one person may share a date of birth). Examples of other identifying attributes include name, age, city of residence, state of residence, postal code, gender, occupation, salary, title, and so on. An identifying attribute which alone may not be enough to reidentify an individual, but can be collectively considered with other attributes to reidentify the individual is referred to as a quasi-identifying attribute. In some embodiments, the database 205 stores data corresponding to multiple entities, in addition to that of entity 120. The database 205 may also include other data stored by and/or processed by the data privacy system 110, including updates to the database 205 resulting from machine learning, information sent to the data privacy system 110 from other devices, synthetic data generated by the data privacy system 110, and so on.

The model generator 220 trains machine learning models. As described above, the data privacy system 110 uses machine learning to automatically identify quasi-identifiers stored in the database 205. To do so, the data privacy system 100 uses unsupervised learning to train a one-versus-rest classifier or other type or classifier, or, in other embodiments, supervised learning to train a model that can identify quasi-identifiers. The data privacy system 110 may also use a binary classifier or other type of machine learning model to assess the risk of a membership inference attack on the database 205. Other machine learning techniques may be used in various embodiments, such as linear support vector machines (linear SVM), boosting for other algorithms (e.g., AdaBoost), neural networks, logistic regression, naïve Bayes, memory based learning, random forests, bagged trees, decision trees, boosted trees, boosted stumps, and so on.

The model store 230 stores the machine learning models generated by the model generator 220. In some embodiments, the model store 230 may store various versions of models as they are updated over time. In other embodiments, the model store 230 may store multiple versions of a type of model.

Figure 3:
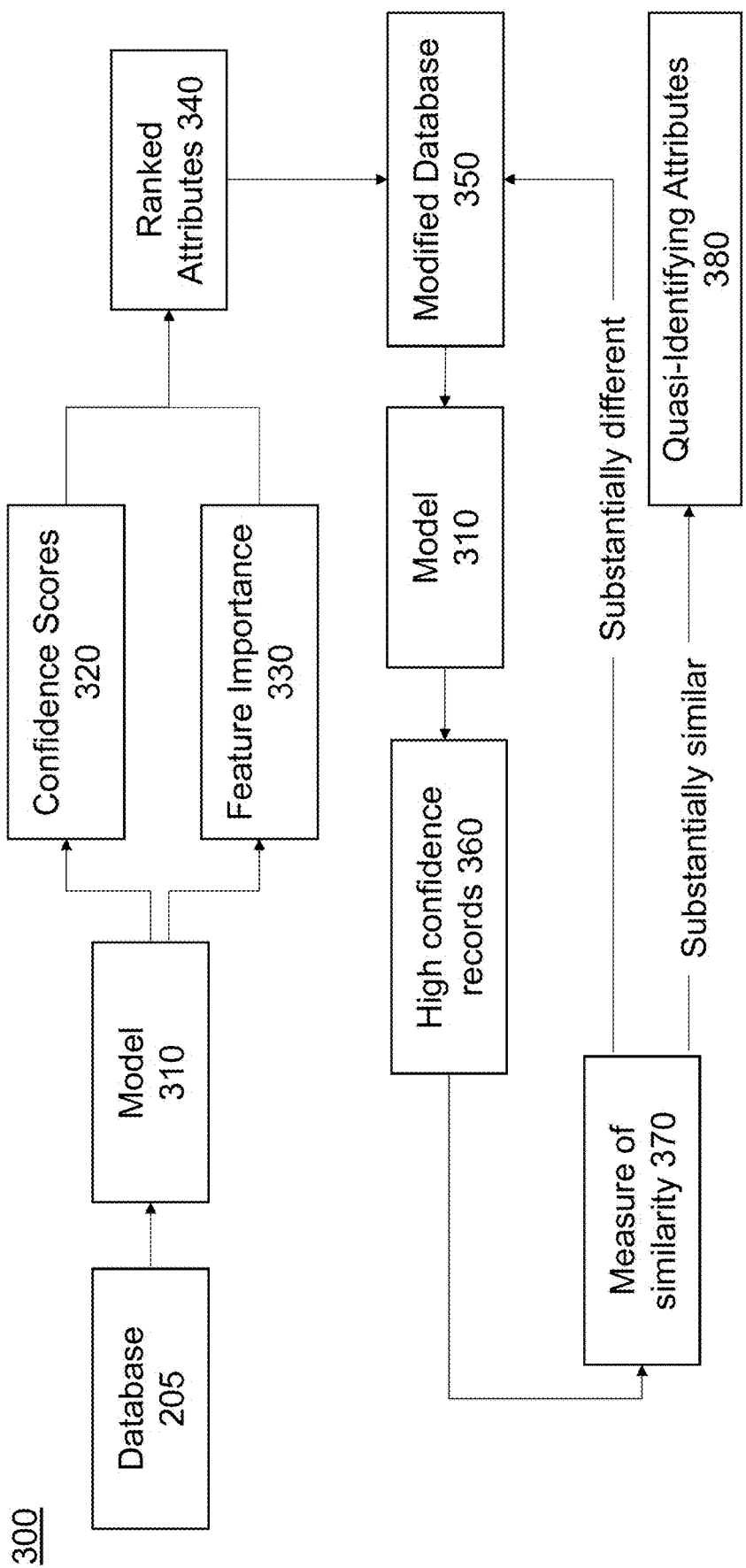
FIG. 3 illustrates a flowchart for training and applying a machine learning model configured to identify quasi-identifiers in a database, in accordance with an example embodiment.

FIG. 3 illustrates a flowchart 300 for training and applying a machine learning model 310 configured to identify quasi-identifiers 380 in the database 205, in accordance with an example embodiment. The data privacy system 110 (or a data privacy engine implemented by or within the data privacy system) accesses and applies the machine learning model 310 to the records in the database 205. The machine learning model 310 may be a one-versus-rest classifier trained by the model generator 220 and stored in the model store 230.

The machine learning model 310 is configured to output a classification for each record input from the database 205, and a corresponding confidence score 320 that represents the model's confidence in its classification of each of the records (e.g., a probability that the model correctly classified the input record). In some embodiments, the model 310 outputs, for a particular input, a confidence score 320 corresponding to each possible output. Using the confidence scores 320, the machine learning model 310 can output a feature importance 330 for each attribute in the database 205. The feature importance 330 of an attribute represents the model's reliance on the attribute to correctly classify the input record and may serve as a proxy for how unique the attribute is to the individual's record. In other words, the feature importance 330 of an attribute correlates with a probability that an individual associated with a record may be reidentified, even if directly identifiable data within the records is anonymized, encoded, encrypted, or otherwise protected.

Based on each attribute's feature importance 330, the data privacy system 110 ranks the attributes 340. The data privacy system 110 generates a modified database by combining the two most highly ranked attributes 340 for the records of the database 205 (for example, including the columns from the database 205 that correspond to the two most highly ranked attributes for each row or record with the database 205). The data privacy system 110 applies the machine learning model 310 to the modified database 350, which outputs a set of classifications for which it has high confidence scores ("the high confidence records 360"). For instance, the machine learning model 310 can attempt to classify each record within the modified database 350, and can output the classification for each record corresponding to a highest confidence score.

The data privacy system 110, in a second iteration, modifies the modified database 350 by adding the next highest ranked attribute 340 to the modified database 350 (e.g., by adding the column from the database 205 corresponding to the next highest ranked attribute to the generated database that includes columns corresponding to the two most highly ranked attributes). The data privacy system 110 then applies the model 310 to the most recently modified database 350 (e.g., the modified database 350 including the next highest ranked attribute 340). The model 310 then outputs the classifications for each record within the modified database 350 corresponding to the highest confidence scores. After this second iteration, the data privacy system 110 determines a measure of similarity 370 between the last two classification outputs of the machine learning model 310 (the classifications from the first iteration and the second iteration). The measure of similarity 370 may be computed using classification metrics that represent the machine learning model 310's performance on its task.

If the measure of similarity 370 is low, meaning the two sets of high confidence records 360 are substantially different, the data privacy system 110 repeats the process in an additional iteration, adding the next highest ranked attribute 340 to the modified database 350 (e.g., by adding the column from the database 205 corresponding to the next highest ranked attribute to the existing modified database). The data privacy system 110 then applies the machine learning model 310 to the newly modified database 350, producing a set of classification outputs, and a new measure of similarity 370 is computed, between the set of classification outputs (the "high confidence records 360) from this iteration and the set of classification outputs from the previous iteration. This process is repeated with additional iterations as needed until the measure of similarity indicates that the sets of the classification outputs between successive iterations is above a threshold measure of similarity.

If the measure of similarity is high, such that the high confidence records 360 are substantially similar (e.g., identical or within a threshold level of similarity), the data privacy system 110 determines that the highest ranked attributes 340 within the immediately preceding iteration of the modified database 350 that were added to the modified database 350 are quasi-identifiers 380. Accordingly, the data privacy system 110 automatically identifies quasi-identifiers 380 present in the records in the database 205.

The data privacy system 110 may perform certain security actions after identifying the quasi-identifiers 380. Based on the measure of similarity 370 for each of the quasi-identifiers 380, the data privacy system 110 may compute a likelihood of reidentification of the records in the database 205. For example, the lower the measure of similarity 370, the more likely the likelihood of reidentification. The data privacy system 110 may perform transformations on the records in the database 205, including anonymizing or encoding data that falls under the quasi-identifiers 380. In some embodiments, the data privacy system 110 removes direct identifying attributes from the database 205. The type and/or number of privacy transformations may depend on the number and/or sensitivity of the quasi-identifiers 380. After performing the privacy transformations on the records in the database 205, the data privacy system 110 may run the process described above again to assess whether further privacy transformations are necessary.

Figure 4:
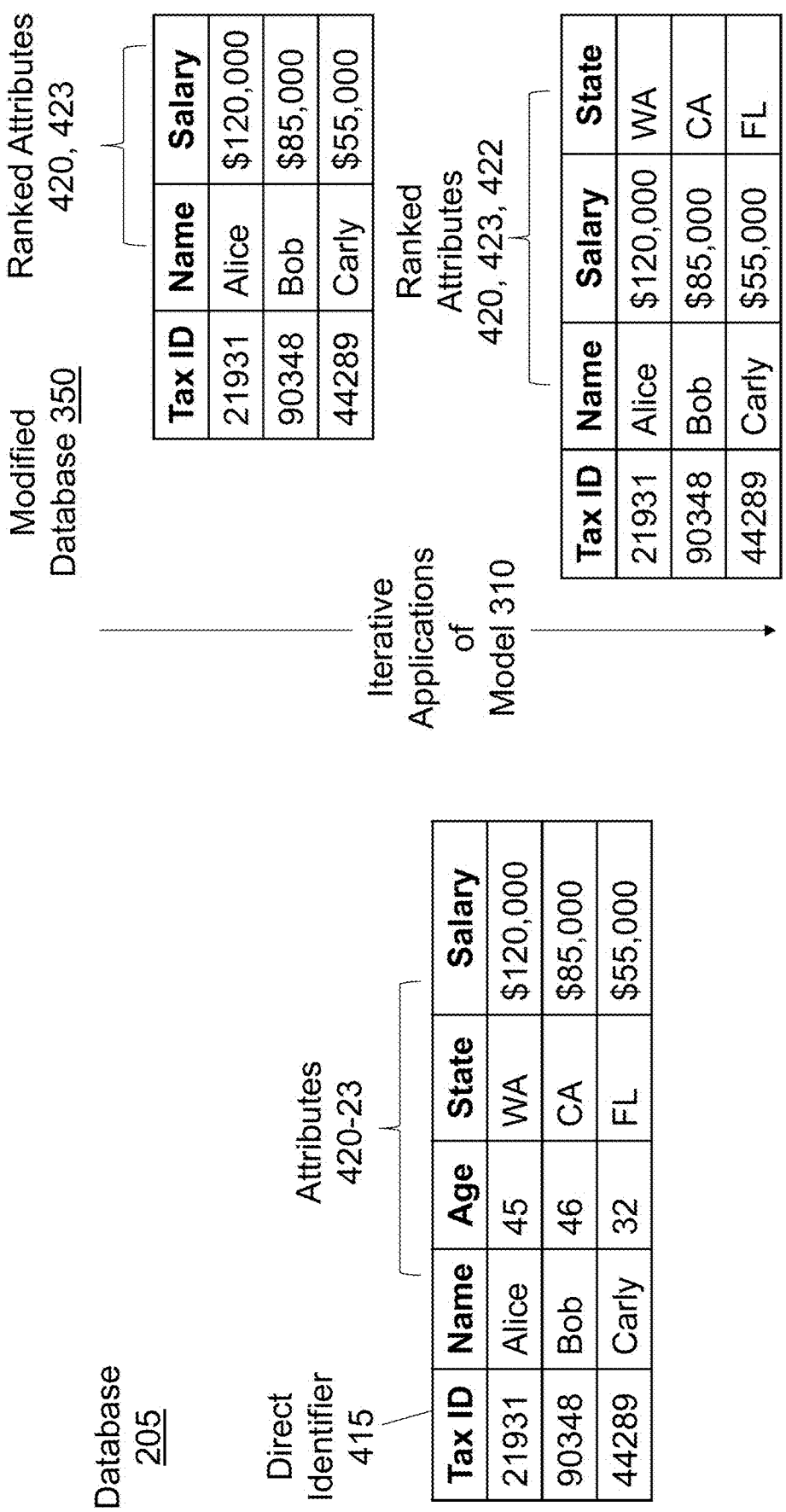
FIG. 4 illustrates examples of databases input into the machine learning model configured to identify quasi-identifiers, in accordance with an example embodiment.

FIG. 4 illustrates examples of databases to which the machine learning model configured to identify quasi-identifiers is applied, in accordance with an example embodiment. The database 205 includes rows representing the records of individuals (here, those of Alice, Bob, and Carly) and columns corresponding to the individuals' attributes, including a direct identifier 415 (the individuals' "Tax ID") and attributes 420 ("Name"), 421 ("Age"), 422 ("State"), and 423 ("Salary"). As described above, the direct identifier 415 is unique to each individual, such as a tax identification number as shown here. The other attributes 420-23, including name, age, state, and salary, may not be unique on their own, but may collectively identify the individuals. The numbers of individuals and attributes and types of attributes are not limited to those depicted here, and the database 205 may include the records of many more individuals of varied attributes.

FIG. 4 also includes an example of how the modified database 350 changes over iterative applications of the machine learning model 310. As described with respect to FIG. 3, the data privacy system 110 determines the highest ranked attributes 340 and modifies the database 350 to include the two highest ranked attributes. In FIG. 4, the two highest ranked attributes are attributes 420 and 423, which correspond to name and salary respectively. The machine learning model 310 takes the modified database 350 as input and outputs a set of highest-confidence classifications for each input record ("high confidence records 360").

In a second iteration, the data privacy system 110 adds the next highest ranked attribute 422, corresponding in this example to state, to the modified database 350. The machine learning model 310 takes the newly modified database 350, which now includes attribute 422, as input, and produces another set of high confidence records 360. The data privacy system 110 determines the measure of similarity 370 between the two sets of high confidence records 360. In response to finding a low measure of similarity 370, for example, the data privacy system 110 may conclude that attributes 420, 423, and 422 are quasi-identifiers 380. The data privacy system 110 iterates the process until the high confidence records 360 of subsequent iterations have a high measure of similarity 370, adding the next highest ranked attribute to the modified database 350 and applying the machine learning model 310 to the most recently modified database 350 to produce a next set of high confidence records. In some embodiments, the data privacy system 110 may find no quasi-identifiers 380 in the database 205. In other embodiments, the data privacy system 110 may find that all the attributes in the database 205 are quasi-identifiers 380.

Figure 5:
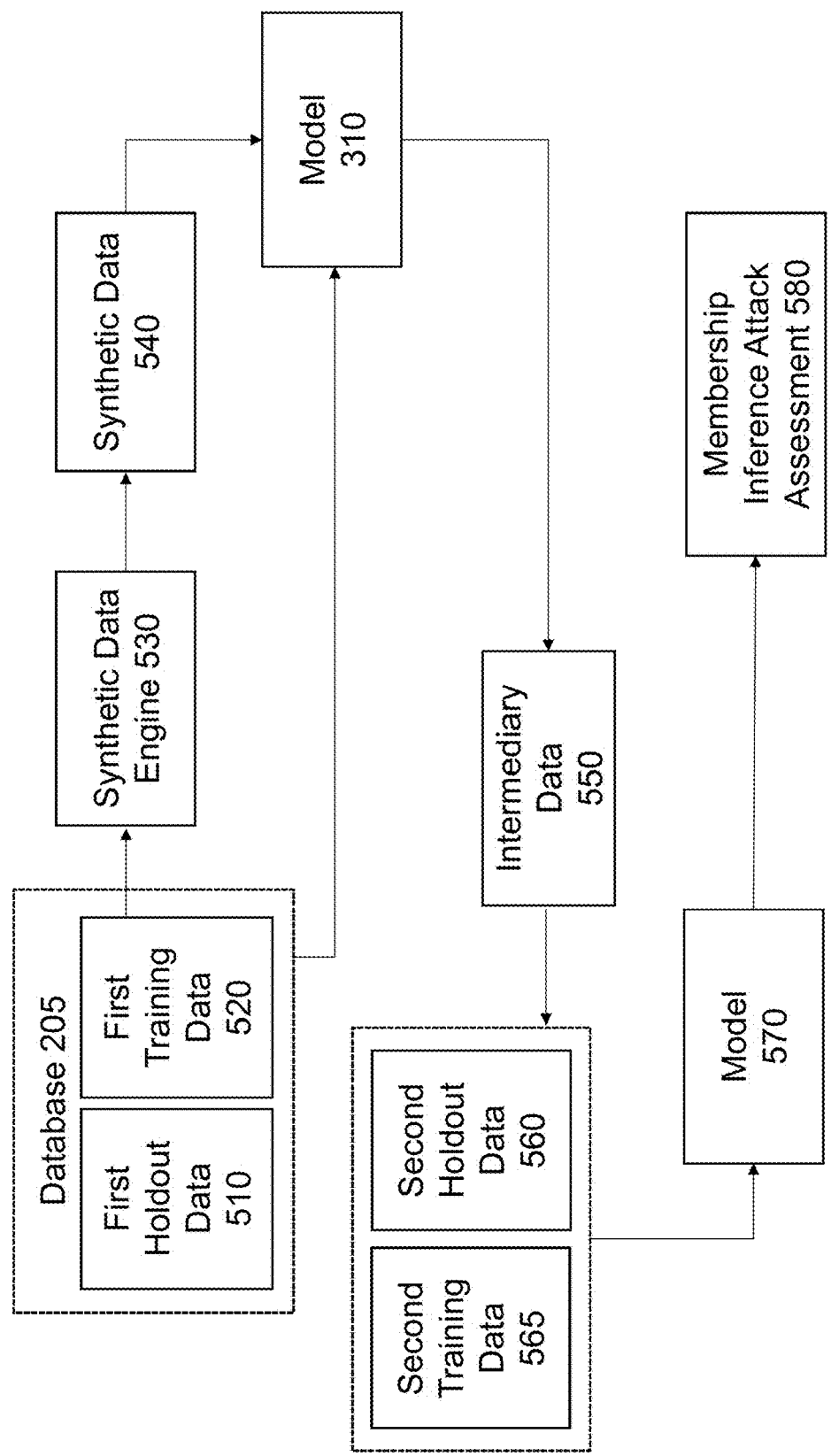
FIG. 5 illustrates a flowchart for training and applying machine learning models configured to identify a database's susceptibility to membership inference attacks, in accordance with an example embodiment.

FIG. 5 illustrates a flowchart 500 for training and applying machine learning models configured to identify a database's susceptibility to membership inference attacks, in accordance with an example embodiment. As described above, a risk of a membership inference attack indicates that a malicious actor (e.g., the malicious actor 130) may be able to discern real individuals' identities even from artificial, synthetic data. The data privacy system 110 (for instance, via a security engine within the data privacy system) can perform the steps, operations, and functions described with regards to FIG. 5.

The records in the database 205 are separated into first holdout data 510 and first training data 520. For instance, the first holdout data 510 can include all attributes/columns of the database 205 and some rows/records of the database 205 (e.g., approximately 10%, 20%, 30%, 40%, 50%, 60%, 70%, 80%, or 90% of the rows/records). The first training data 520 includes all remaining portions of the database 205, for instance all rows/records not included within the first holdout data 510. The first holdout data 510 serves as a modeling control and can be used for validation of the performance of the model.

A synthetic data engine 530 takes, as input, the first training data 520 and generates synthetic data 540 based on the first training data 520. For instance, the synthetic data engine 530 may use techniques such as generative artificial intelligence techniques, statistical models, deep learning, data masking, encoding, tokenization, or some combination thereof to generate the synthetic data 540. Though the synthetic data 540 is artificial and does not directly represent characteristics of records or real individuals, because it was produced using real data (e.g., from the training data 520), there is a risk that all or part of the synthetic data is highly associated with real records (and thus can be used to identify those records).

The data privacy system 110 applies the machine learning model 310 to the synthetic data 540, which classifies the records in the synthetic data 540. The machine learning model 310 also outputs a confidence score (e.g., similar to the confidence scores 320) for its classification of each of the records. The data privacy system 110 filters the synthetic data 540 using the confidence scores to identify synthetic records that are highly associated with records or real individuals' data. In some embodiments, the data privacy system 110 applies the machine learning model 310 to the database 205 as described above (for instance, with respect to FIG. 3) to identify quasi-identifiers of the synthetic data 540.

The data privacy system 110 generates an intermediary database (intermediary data 550) based on the classifications and confidence scores produced by the machine learning model 310. The intermediary database can include some of all of: 1) records from the database 205, 2) attributes within the database 205 that are determined to be quasi-identifiers 380, 3) synthetic attributes from the synthetic data 540 associated with the highest confidence scores, and 4) an indication of whether each record within the intermediary data 550 is also present within the first training data 520.

The data privacy system 110 splits this intermediary data 550 into second holdout data 560 and second training data 565. The second holdout data 560 can include any portion of records from the intermediary data 550 (such as any of the holdout percentages described above with regards to the first holdout data 510), and the second training data 565 can include all remaining records from the intermediary data 550 not included within the second holdout data 560. The data privacy system 110 trains (e.g., via the model generator 220) a machine learning model 570 using the second training data 565 to determine if an input record is present within another database, such as the first training data 520 or the database 205. The second holdout data 560 can be used by the data privacy system 110 as a control in order to validate the machine learning model 570. In some embodiments, the model 570 is a machine learning binary classifier configured to predict which records within the second holdout data 560 are also present within the first training data 520, though it should be emphasized that the model 570 can include any type of classifier or machine learning model.

The data privacy system 110 applies the trained machine learning model 570 to the second holdout data 560. The trained machine learning model 570 predicts whether each record in the second holdout data 560 is present in the first training data 520 and outputs a confidence score for each prediction. Where the machine learning model 570 successfully identifies the records in the second holdout data 560 that are present in the first training data 520, the data privacy system 110 flags the database 205 as susceptible to a membership inference attack 580.

In some embodiments, successfully identifying records in the second holdout data 560 that are included within the first training data 520 can include successfully identifying an above-threshold percentage of the records that are included in both datasets. The threshold can be any suitable threshold over 50%, such as 60%, 70%, 75%, 80%, 85%, 90%, 95%, and 100% (a 50% success rate is expected for a model that guesses randomly). This threshold can be set by a user, a security manager, or any other suitable entity. In some embodiments, the data privacy system 110 may set different thresholds for different types or sensitivities of data (e.g., the more sensitive the data, the lower the threshold required to identify the database as susceptible to attack). In some embodiments, the data privacy system 110 quantifies the risk of a membership inference attack 580 based on the confidence scores output by the machine learning model 570 and/or based on the sensitivity of quasi-identifiers 380 present in the database 205.

The data privacy system 110 may perform security actions after flagging the database 205 as vulnerable to a membership inference attack 580. For example, the data privacy system 110 may retrain the machine learning model 310 applied to the synthetic data 540. In another example, the data privacy system 110 may add additional records or synthetic records to the database 205, or may perform one or more data privacy operations on the database 205, such as anonymization operations, encoding operations, encryption operations, tokenization operations, and the like.

In some embodiments, after performing these data privacy operations, the process described herein is re-performed iteratively (e.g., the susceptibility to membership inference attacks is determined and further data records are added/data privacy operations are performed) until the database 205 is determined to less susceptible than a threshold susceptibility to a membership inference attack. Once the database has been protected and secured, one or more database records can be transmitted to an external entity (such as a recipient of the data records) or a data storage location (such as an external database) for subsequent storage and use.

Process for Identifying Quasi-Identifiers in a Database

Figure 6:
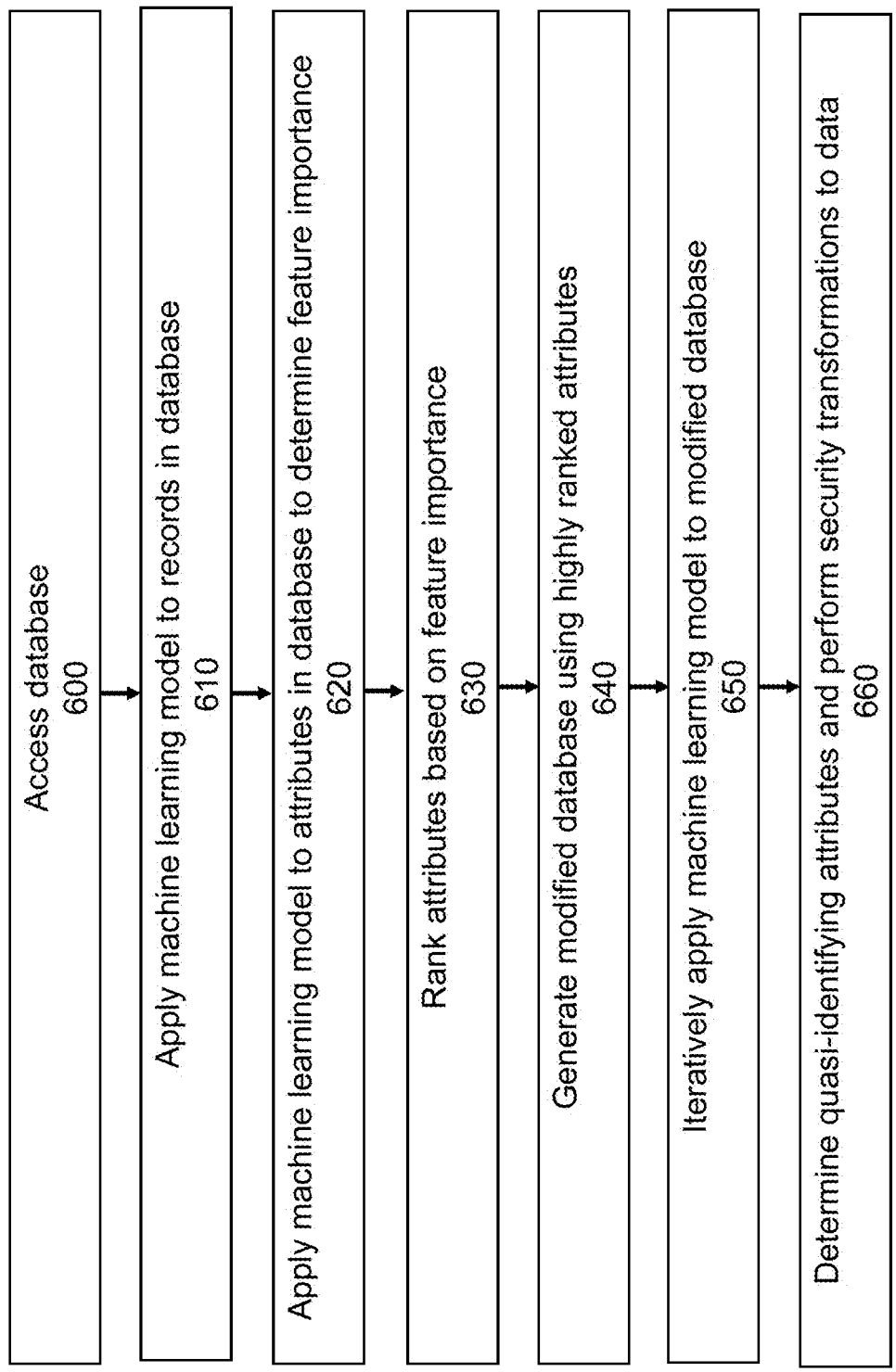
FIG. 6 illustrates an example process for identifying quasi-identifiers in a database, in accordance with an example embodiment.

FIG. 6 illustrates an example process for identifying quasi-identifiers in a database, in accordance with an example embodiment. A data privacy system (e.g., the data privacy system 110) accesses 600 a database (e.g., the database 205). The database includes rows corresponding to individuals' records and columns corresponding to attributes (e.g., the attributes 420 to 423). It should be noted that the accessed database can be local or external to the data privacy system 110, and can include any number or type/category of data records or attributes.

The data privacy system applies 610 a machine learning model (e.g., the machine learning model 310) to the database. The machine learning model is configured to classify each record in the database (for instance, as one or more records, record types, or record categories) and produce a measure of confidence (e.g., the confidence scores 320) for each combination of input record and output record.

The data privacy system applies 620 the machine learning model to each attribute in the database and feature importance is extracted (e.g., feature importance 330) for each attribute in the database. Feature importance is a measure of how the attribute contributes to the classification by the machine learning model of each record.

The data privacy system then ranks 630 the attributes using feature importance (e.g. the ranked attributes 340). The data privacy system generates 640 a modified database (e.g., the modified database 350) using the two most highly ranked attributes. The rows of the modified database are records from the accessed database, and the columns of the modified database include the columns of the accessed database corresponding to the two most highly ranked attributes.

The data privacy system iteratively applies 650 the machine learning model to the modified database to produce a set of records with the highest measures of confidence (e.g., the high confidence records 360) and modifies the modified database to include a next highest ranked attribute. The data privacy system then re-applies the machine learning model to the newly modified database to produce a next set of records with the highest measures of confidence. This process iteratively repeats until consecutive sets of records produced by the machine learning model have an above threshold measure of similarity (e.g., the measure of similarity 370).

When the measure of similarity between consecutive sets of records produced by the machine learning model is greater than a threshold value, the data privacy system determines that the attributes included in the previous iteration of the modified database (e.g., the iteration before the most recent iteration of the modified database) are quasi-identifiers (e.g., the quasi-identifiers 380). The data privacy system determines 660 that certain attributes of the accessed database are quasi-identifiers and, in response, performs one or more security operations the data within the columns corresponding to the quasi-identifiers.

Process for Estimating Membership Inference Attack Risk

FIG. 7 illustrates an example process for assessing a database's susceptibility to membership inference attacks, in accordance with an example embodiment. The data privacy system accesses 700 a database, and splits the accessed database into a first holdout database (e.g., the first holdout data 510) and a first training database (e.g., the first training data 520).

The data privacy system generates 710 synthetic data (e.g., the synthetic data 540) by applying a synthetic data engine (e.g., the synthetic data engine 530) to the first training database. The data privacy system applies 720 a machine learning model to the synthetic database to produce a measure of confidence that each synthetic record in the synthetic database is a record in the accessed database. The machine learning model applied by the data privacy system is configured to classify input records as one or more of the records in the accessed database.

The data privacy system generates 730 an intermediary database (e.g., the intermediary data 550) comprising records of the accessed database, quasi-identifiers within the accessed database, synthetic attributes corresponding to a threshold number of synthetic records associated with the greatest measures of confidence, and a column indicating whether each synthetic record is included in included in the first training database. The data privacy system is configured to split the intermediary database into a second holdout database and a second training database.

The data privacy system trains 740 a machine learning binary classifier (e.g., the model 570) using the second training database. The machine learning binary classifier is configured to classify input records as present or absent within the first training database. The data privacy system applies 750 the machine learning binary classifier to the second holdout database to predict which records in the second holdout database are within the first training database.

In response to the machine learning binary classifier successfully identifying some of all of the records in the second holdout database that are within the first training database, the data privacy system assesses 760 the risk of a membership inference attack and flags the database as susceptible to attack. In response to determining that the database is susceptible to a membership inference attack, the data privacy system may perform one or more privacy transformations or data privacy operations on the database in order to reduce the susceptibility of the database to a membership inference attack.

Additional Configuration Considerations

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   accessing a database storing a dataset comprising a set of rows each corresponding to a record and a set of columns each corresponding to an attribute;

applying a machine learning model to the dataset, the machine learning model configured to classify each record in the database and produce a measure of feature importance for each attribute in classifying each record;

generating a modified database using two attributes determined to be most highly ranked based on the produced feature importances; and generating a final database within a non-transitory computer-readable storage medium by iteratively applying the machine learning model to the modified database to produce a set of records and modifying the modified database to include a next-highest ranked attribute until consecutive sets of records have an above-threshold measure of similarity, wherein the attributes included within the modified database before a most-recently included attribute comprise quasi-identifiers.

2. The method of claim 1, further comprising computing, for each quasi-identifying attribute, a likelihood of reidentification of the records in the database based on the measure of similarity.

3. The method of claim 2, further comprising performing privacy transformations on data in the database corresponding to the quasi-identifiers based on the likelihood of reidentification of the records.

4. The method of claim 3, wherein performing privacy transformations on the data prevents reidentification of the records, comprising at least one of anonymizing or encoding the data corresponding to the quasi-identifiers.

5. The method of claim 3, further comprising performing privacy transformations on the data based on usefulness of potential quasi-identifiers for reidentification attacks.

6. The method of claim 3, further comprising performing privacy transformations on the data based on a number of the quasi-identifiers.

7. The method of claim 3, wherein the privacy transformations comprise removing data corresponding to direct identifying attributes.

8. The method of claim 3, further comprising
recomputing the likelihood of reidentification of the records after performing the privacy transformations on the data;
in response to a greater than threshold likelihood of reidentification, performing further privacy transformations on the data.

9. The method of claim 1, wherein the machine learning model is a one-versus-rest classifier.

10. A non-transitory computer-readable storage medium storing executable instructions that, when executed by a hardware processor, cause the hardware processor to perform steps comprising:
accessing a database storing a dataset comprising a set of rows each corresponding to a record and a set of columns each corresponding to an attribute;
applying a machine learning model to the dataset, the machine learning model configured to classify each record in the database and produce a measure of feature importance for each attribute in classifying each record;
generating a modified database using two attributes determined to be most highly ranked based on the produced feature importances; and
generating a final database within a non-transitory computer-readable storage medium by iteratively applying the machine learning model to the modified database to produce a set of records and modifying the modified database to include a next-highest ranked attribute until consecutive sets of records have an above-threshold measure of similarity, wherein the attributes included within the modified database before a most-recently included attribute comprise quasi-identifiers.

11. The non-transitory computer-readable storage medium of claim 10, wherein the instructions cause the hardware processor to perform steps further comprising computing, for each quasi-identifying attribute, a likelihood of reidentification of the records in the database based on the measure of similarity.

12. The non-transitory computer-readable storage medium of claim 11, wherein the instructions cause the hardware processor to perform steps further comprising performing privacy transformations on data in the database corresponding to the quasi-identifiers based on the likelihood of reidentification of the records.

13. The non-transitory computer-readable storage medium of claim 12, wherein performing privacy transformations on the data prevents reidentification of the records, comprising at least one of anonymizing or encoding the data corresponding to the quasi-identifiers.

14. The non-transitory computer-readable storage medium of claim 12, wherein the instructions cause the hardware processor to perform steps further comprising performing privacy transformations on the data based on a sensitivity of the quasi-identifiers.

15. The non-transitory computer-readable storage medium of claim 12, wherein the instructions cause the hardware processor to perform steps further comprising performing privacy transformations on the data based on a number of the quasi-identifiers.

16. The non-transitory computer-readable storage medium of claim 12, wherein the instructions cause the hardware processor to perform steps further comprising:
recomputing the likelihood of reidentification of the records after performing the privacy transformations on the data; and
in response to a greater than threshold likelihood of reidentification, performing further privacy transformations on the data.

17. A data privacy system comprising:
a hardware processor;
a non-transitory computer-readable storage medium storing executable instructions that, when executed, cause the hardware processor to perform steps comprising:
accessing a database storing a dataset comprising a set of rows each corresponding to a record and a set of columns each corresponding to an attribute;
applying a machine learning model to the dataset, the machine learning model configured to classify each record in the database and produce a measure of feature importance for each attribute in classifying each record;
generating a modified database using two attributes determined to be most highly ranked based on the produced feature importances; and
generating a final database within a non-transitory computer-readable storage medium by iteratively applying the machine learning model to the modified database to produce a set of records and modifying the modified database to include a next-highest ranked attribute until consecutive sets of records have an above-threshold measure of similarity, wherein the attributes included within the modified database before a most-recently included attribute comprise quasi-identifiers.

18. The data privacy system of claim 17, wherein the instructions cause the hardware processor to perform steps further comprising computing, for each quasi-identifying attribute, a likelihood of reidentification of the records in the database based on the measure of similarity.

19. The data privacy system of claim 17, wherein the instructions cause the hardware processor to perform steps further comprising performing privacy transformations on data in the database corresponding to the quasi-identifiers based on the likelihood of reidentification of the records.

20. The data privacy system of claim 17, wherein the instructions cause the hardware processor to perform steps further comprising:
- recomputing the likelihood of reidentification of the records after performing the privacy transformations on the data;
- in response to a greater than threshold likelihood of reidentification, performing further privacy transformations on the data.

\* \* \* \* \*